United States Patent Office 3,142,715
Patented July 28, 1964

3,142,715
PROCESS OF FORMING ACRYLIC RESIN CAST-
ING USING A PERFLUOROCARBON SUR-
FACED MOLD
Robert Emmett Burk, West Chester, Pa.
No Drawing. Filed Mar. 26, 1962, Ser. No. 182,673
9 Claims. (Cl. 264—213)

This invention relates to casting acrylic resin sheets between perfluorocarbon surfaces.

In the past, acrylic resins have been cast on metal, cellophane and polyvinyl alcohol surfaces. Such prior art processes are disclosed in U.S. Patent Nos. 2,345,013, issued to Frank J. Soday on March 28, 1944, and 2,750,320, issued to Morton E. Latham on June 12, 1956. When using a metal casting surface, an antistick agent must be used so as to prevent acrylic resin being cast from sticking to the metal surface. This prevents forming a very smooth surface on the thus-cast acrylic resin sheet. The cellophane and polyvinyl alcohol casting surfaces are not suited for reuse. Glass is a common casting surface, but glass sheets require especially careful handling.

It is an object of this invention to provide a process of casting acrylic resins which utilizes a casting surface which is reusable, does not require the use of an antistick agent, and is easy to handle.

These objects are accomplished by using a casting surface formed of certain perfluorocarbon resins when casting acrylic resins.

The perfluorocarbon casting surfaces suitable for use in the process of this invention are those disclosed in and prepared in accordance with U.S. Patent No. 2,946,763, issued July 26, 1960, to Bro et al. and U.S. Patent No. 2,955,099, issued October 4, 1960, to Mallouk et al., which disclosures are herein incorporated by reference. Perfluorocarbon interpolymers of hexafluoropropylene and tetrafluoroethylene containing over 2 moles percent hexafluoropropylene are suitable. Hexafluoropropylene homopolymer works satisfactorily, but is prohibitively expensive to produce. The preferred casting surfaces are resinous interpolymeric hexafluoropropylene and tetrafluoroethylene having a specific melt viscosity, as measured at 380° C. under a shear stress of 6.5 pounds/square inch, of $1.5 \times 10^3$ to $3 \times 10^5$ poises, a specific I.R. ratio, as measured on a film of about 2 mil thickness water-quenched from the molten product, by net absorbance of 10.18 microns wavelength divided by net absorbance at 4.25 microns wavelength, in the range of 1.5 to 6, which ratio is at least equal to the difference between 12.26 and the product of 1.96 and the common logarithm of the said specific melt viscosity, and a specific volatile content, as measured by weight loss during 30 minutes at 380° C. under a pressure of 10 mm./Hg absolute, of less than 0.3%.

Example I is illustrative of the invention.

Example I

A 6″ x 6″ piece of aluminum foil surfaced with a film of perfluorocarbon, formed by Example II of U.S. Patent 2,946,763, previously mentioned, was placed on a smooth wooden table. The aluminum foil had been surfaced with a 1/8″ extruded sheet of the perfluorocarbon which was adhered to said aluminum foil by means of an epoxy cement after treatment of the perfluorocarbon surface with sodium dissolved in liquid ammonia. A 1/8″ thick extruded piece of the above perfluorocarbon, 8″ x 8″ square with a 4″ x 4″ square section in the center removed, was placed on top of said perfluorocarbon-coated aluminum foil. The thus-formed mold cavity was then filled with methyl methacrylate prepolymer sirup containing 1% lauroyl peroxide combined with .2% "Lupersol" DDM made by the Lucidol Division of Wallace and Tiernan Inc. of Buffalo, New York, which is a 60% solution of methylethyl ketone peroxide in dimethyl phthalate. The methyl methacrylate sirup had been formed by charging a stirred, water-jacketed kettle, provided with a reflux condenser, with 116 parts of inhibitor-free, monomeric methyl methacrylate and 0.73 part of lauryl mercaptan, and heating to 80° C. To this was added 0.0363 part alpha,alpha'-azobisisobutyronitrile dissolved in 5 parts of methyl methacrylate monomer. The solution was then refluxed at 103° C. until the viscosity reached 20 poises (on a sample cooled to 25° C.), which took about 40 minutes. The reaction was quenched by addition of a 25° C. solution of 0.00328 part hydroquinone in 10 parts of methyl methacrylate. The resulting sirup contained no detectable initiator, had a viscosity of about 20 poises at 25° C., a polymer content of about 35%, and inherent viscosity of about .32, and a molecular weight of about 50,000. The filled mold cavity was covered with a 1/8″ thick 6″ x 6″ sheet, of the above-described perfluorocarbon, backed with a 1/4″ transparent acrylic resin sheet, topped with an 8 oz. weight, and allowed to cure for 90 minutes at 40° C. The weight was then removed and the cast methyl methacrylate sheet removed. The cast methyl methacrylate sheet had a particularly high luster and quality of surface. The cast methyl methacrylate did not adhere to the perfluorocarbon mold and was readily removed with light finger pressure. The casting procedure was repeated a large number of times with the above-described mold and a first class product was still produced which did not stick to the mold.

The results of this invention are unexpected, because when acrylic resins are cast in polytetrafluoroethylene homopolymer molds, the cast acrylic resin adheres tenaciously to the mold and the usefulness of the mold is completely destroyed after only a few runs. In contrast, however, acrylic resins do not adhere to the perfluorocarbon molds of this invention.

Various acrylic monomers can be utilized in the performance of this invention. Such acrylic monomers include, in addition to methyl methacrylate, acrylic acid, acrolein and methacrolein monomers having the basic formula

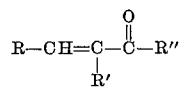

where R, and R', are monovalent hydrocarbon radicals containing from 0 to 2 carbon atoms, and R″ is selected from the group consisting of H, and OR″ wherein R‴ is a monovalent hydrocarbon radical containing from 0 to 2 carbon atoms.

Since the perfluorocarbons used as the mold surface in this invention are substantially transparent, photopolymerization, as well as chemical catalytic agents, can be used to induce polymerization in the mold.

The molds used in this invention can be formed from the perfluorocarbon interpolymer alone, or a conventional mold, such as a steel cavity mold, can be surfaced with the perfluorocarbon interpolymer by laminating or coating. In addition to the stationary-type mold used to carry out a batch process as in Example I, which mold is handled in a manner analogous to a glass mold, the perfluorocarbon interpolymer may be used in the form of a belt so as to provide for continuous casting or acrylic sheeting. The belt can be an endless belt as in FIGURE 10 of the aforementioned U.S. Patent 2,345,013, or a roll such as in FIGURE 1 of the aforementioned U.S. Patent 2,750,320. For instance, a steel belt coated with the perfluorocarbon interpolymer could be used.

The acrylic monomer used in carrying out this invention may either be all monomer or may be in the form of a syrup. Suitable acrylic casting syrups are disclosed in application for U.S. patent, Serial No. 694,513, filed November 5, 1957, by Calkins et al.

I claim:

1. A process of forming acrylic resin articles which comprises the steps of casting a liquid comprising an acrylic monomer upon a mold having a solidified casting surface of a perfluorocarbon interpolymer of hexafluoropropylene and tetrafluoroethylene containing at least 2 moles percent of hexafluoropropylene, curing the acrylic resin, and then removing the cast acrylic resin from the perfluorocarbon.

2. The process of claim 1 in which the mold is stationary and is used to perform a batch casting process.

3. The process of claim 1 wherein the mold comprises a moving endless belt.

4. The process of claim 1 wherein the mold is formed from a structure surfaced with the perfluorocarbon.

5. A process of forming acrylic resin articles which comprises the steps of casting a liquid comprising an acrylic monomer upon a mold having a solidified casting surface of a perfluorocarbon resin comprising an interpolymeric hexafluoropropylene and tetrafluoroethylene having a specific melt viscosity, as measured at 380° C. under a shear stress of 6.5 pounds per square inch, of $1.5 \times 10^3$ to $3 \times 10^5$ poises, a specific I.R. ratio, as measured on film of about 2 mil thickness water-quenched from the molten product, by net absorbance at 4.25 microns wavelength, in the range of 2.77 to 5, which ratio is at least equal to the difference between 12.585 and the product of 1.963 and the common logarithm of the said specific melt viscosity, and a specific volatile content, as measured by weight loss during 30 minutes at 380° C. under a pressure of 10 mm./Hg absolute, of less than 0.2%, curing the acrylic resin, and then removing the cast acrylic resin from the perfluorocarbon.

6. The process of claim 5 wherein the mold is stationary and is used to perform a batch casting process.

7. The process of claim 5 wherein the mold comprises a moving endless belt.

8. The process of claim 5 wherein the mold is formed from a structure surfaced with the perfluorocarbon.

9. The process of claim 5 wherein the acrylic monomer is methyl methacrylate.

References Cited in the file of this patent

UNITED STATES PATENTS

| | | |
|---|---|---|
| 2,752,638 | Anspon | July 3, 1956 |
| 2,983,570 | Lux | May 9, 1961 |
| 3,041,668 | Bonza et al. | July 3, 1962 |

OTHER REFERENCES

Fluorine Plastics, page 2689 Chemical and Engineering News, volume 30, No. 26, June 30, 1952.